(12) United States Patent
Sugiyama

(10) Patent No.: US 6,784,589 B1
(45) Date of Patent: Aug. 31, 2004

(54) PLANE CARBON COMMUTATOR

(75) Inventor: Kenichi Sugiyama, Tokyo (JP)

(73) Assignee: Sugiyama Seisakusyo Co. Ltd., Tokyo (JP)

( * ) Notice: Subject to any disclaimer, the term of this patent is extended or adjusted under 35 U.S.C. 154(b) by 0 days.

(21) Appl. No.: 09/579,294

(22) Filed: May 25, 2000

(51) Int. Cl.[7] .......................... H02K 13/00; H01R 39/06
(52) U.S. Cl. ........................................ 310/237; 310/233
(58) Field of Search ................................ 310/233, 237, 310/219–249, 251–253

(56) References Cited

U.S. PATENT DOCUMENTS 6,242,838 B1 * 6/2001 Kiyose et al. ............... 310/233

FOREIGN PATENT DOCUMENTS

| JP | 7-298560 | 11/1995 |
| JP | 10-4653 | 1/1998 |
| JP | 10004653 A * 1/1998 | ......... H02K/13/00 |

* cited by examiner

Primary Examiner—Burton Mullins
(74) Attorney, Agent, or Firm—Brenda O. Holmes; Kilpatrick Stockton LLP

(57) ABSTRACT

A plane commutator in which it is easy to integrally form carbon and segment, connecting strength between the carbon and mold resin is enhanced, and conductivity is enhanced. The plane carbon commutator comprises a plurality of metal segments fixed to a commutator body made of resin, engaging projections provided on a carbon which was previously burnt at a high temperature, the engaging projections being engaged with engaging holes provided in the segments functioning to allow insertion of the engaging projections into the engaging holes but prevent the engaging projections from being pulled out from the engaging holes are projected from peripheral edges of the engaging holes, and the cut-rising pieces are brought into contact under pressure with peripheral faces of the engaging projections. Peripheral faces of tip end side engaging projections are formed into coarse faces, and conductive paste is interposed between the segments and the carbon.

3 Claims, 5 Drawing Sheets

PLANE CARBON COMMUTATOR

BACKGROUND OF THE INVENTION

1. Field of the Invention

The present invention relates to a plane carbon commutator used as a commutator for a motor of a fuel pump and the like, and to a producing method of the plane carbon commutator. More particularly, the present invention relates to a plane carbon commutator fore reliably connect segment and carbon in the commutator, and to a producing method of the plane carbon commutator.

2. Description of the Related Art

A plane carbon commutator comprises a metal segment attached to an end face of a commutator body made of mold resin, and carbon attached to the segment. As a producing method of this kind of plane carbon commutator, there are the following methods (A) to (D) for example.

(A) When carbon is formed, a base metal which is a segment is inserted into the carbon and the base metal and the carbon are integrally formed and burnt and then, the base metal which was integrally molded with the carbon is integrally molded with the mold resin, thereby forming an insulator portion (see Japanese Patent Application Laid-open No. H7-264812 for example).

(B) An insulator and a metal base are previously integrally formed by integrally molding or the like and then, carbon is attached to a face of the metal base by soldering or conductive adhesive (see Japanese Patent Application Laid-open No. H5-502974 for example).

(C) An insulator and a metal base are previously integrally formed by integrally molding or the like and then, carbon is formed on a face of the metal base and burnt (see Japanese Utility Model Publication No. H7-42223 for example).

(D) An insulator and a metal base are previously prepared separately, and when carbon is formed, the metal base and the insulator are integrally molded with the carbon (see Japanese Patent Application Laid-open No. H6-178503 for example).

In the method (A), a temperature for burning the carbon is high as higher as about 600° C. or higher. Therefore, the integrally formed metal base is softened, and the product has a problem in terms of precision and strength. Thereupon, the carbon can be burnt at a low temperature about 200° C., but in such a case, the quality of material of the carbon itself becomes special, and there is a problem in various characteristics such as hardness, electrical resistance and gasoline resistance.

In the method (B), the carbon can be previously burnt singly, and there is no problem in the quality of material of the carbon itself. However, if the carbon is soldered to the face of the metal base, there is an adverse possibility that the solder is loosened by a high temperature of wire at the time of assembling of a motor.

If the metal base and the carbon are adhered by the conductive adhesive, this structure requires an adhesive having both conductive property and gasoline resistance, which is expensive. Further, even if the adhesive has the conductive property, electrical resistance thereof is greater as compared with the carbon and the metal base, and there is a problem that this portion is prone to generate heat and a material thereof is prone to be changed when a motor is driven.

In the method (C), the insulator made of resin is carbonized by a high temperature when the carbon is burnt on the face of the metal base. Therefore, the carbon must be burnt at a low temperature, and there is a problem in the quality of material of the carbon.

The method (D) has the same problem as that of the method (C).

Thereupon, in order to solve the above-described conventional problems, the present assignee filed Japanese Patent Application No. H9-51991 (Japanese Patent Application Laid-open No. 10-4653, which will be referred to as "prior example" hereinafter). In the prior example, a segment is formed with an engaging hole, and an engaging projection provided with carbon that was previously burnt at a high temperature is engaged into the engaging hole and integrally formed as one piece. Therefore, the segment and the carbon can be integrally formed with out using solder or adhesive, and the initial object could be achieved.

In the prior example, when the engaging projection formed on the carbon is engage with the engaging hole formed on the segment and attached and integrally formed, shrinkage fit and press-fit are carried out, and after the engaging projection is engaged with and inserted into the engaging hole, burring or the like is carried out. The engaging projection is fastened by a projection formed by the burring.

Therefore, when the engaging projection of the carbon is inserted into the engaging hold of the segment and both of them are integrally formed, there is a problem that the process for integrally forming them is troublesome.

SUMMARY OF THE INVENTION

It is an object of the present invention to solve the problems described above.

According to a first aspect of the present invention, there is provided a plane carbon commutator comprising a plurality of metal segments fixed to a commutator body made of resin, engaging projections provided on a carbon which was previously burnt at high temperature, said engaging projections being engaged with engaging holes provided in said segments and integrally formed as one unit, wherein tip ends of cut-rising pieces functioning to allow insertion of said engaging projections into said engaging holes but prevent said engaging projections from being pulled out from said engaging holes, and said cut-rising pieces are brought into contact under pressure from peripheral faces of said engaging projections.

According to a third aspect of the present invention, in the plane carbon commutator of the first or the second aspect, conductive paste is interposed between said segments and said carbon.

According to a fourth aspect of the present invention, there is provided a producing method of a plane carbon commutator comprising a plurality of metal segments fixed to a commutator body made of resin, and carbon, said segments and said carbon are integrally fixed to each other, wherein said method comprises the steps of: (a) forming peripheral faces of said engaging projections into coarse faces when engaging projections formed on said carbon are inserted into engaging holes formed in a metal base which will become said segments in order to integrally form said carbon which was previously burnt at a high temperature and said metal base; (b) integrally forming said metal base and said carbon and then, coating the entire exposed face of said carbon with mold resin when said engaging projections formed on said carbon are inserted into said engaging holes formed in said metal base; (c) cutting said metal base into each segment and at the same time, cutting said carbon; and (d) removing said mold resin from a contact face between said carbon and a brush.

DETAILED DESCRIPTION OF PREFERRED EMBODIMENT

Figure 1B:
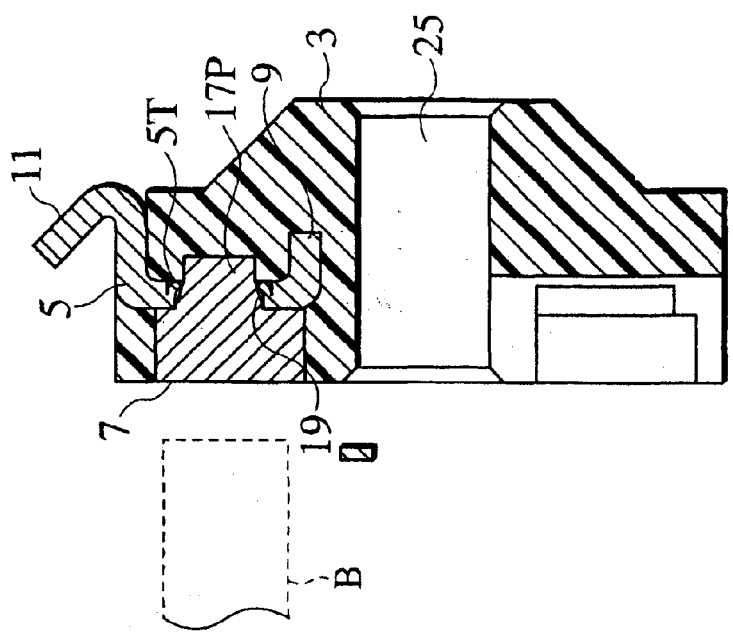
FIGS. 1A and 1B are explanatory diagrams of a plane carbon commutator according to the present invention.
Figure 1A:
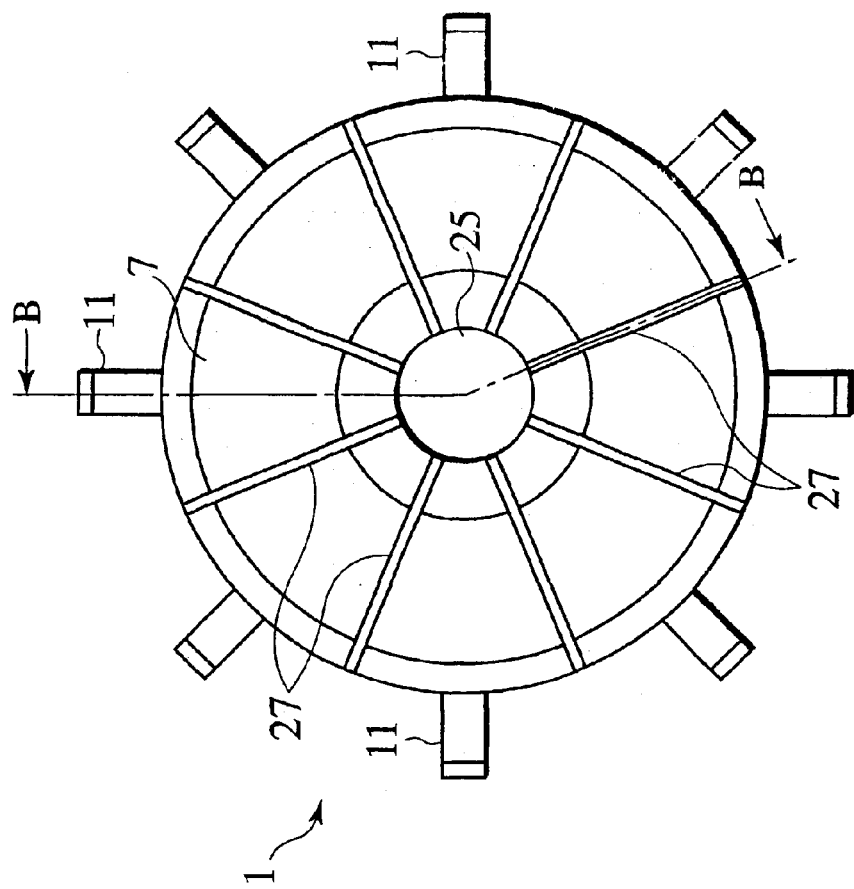

As shown in FIG. 1, a plane carbon commutator 1 according to the present embodiment comprises a commutator body 3 made of mold resin, a plurality of segments 5 made of metal such as copper or copper alloy integrally fixed to an end face of the commutator body 3, and carbon 7 integrally fixed to the segments 5.

Each of the segments 5 includes a plurality of anchor claws 9 embedded in the commutator body 3, and a wire bonding portion 11.

The commutator 1 is produced as follows. That is, as is known, an annular metal base 15 (see FIG. 2) provided at its inner and outer peripheral edges with portions which will become the anchor claws 9 and the wire bonding portion 11, and provided with portions which will be cut and separated by the plurality of segments 5 by forming slits 27 is formed. The metal base 15 is formed by stamping using punching.

At that time, in the present embodiment, engaging holes 5H (see FIG. 2) respectively corresponding to the segments S are formed in the metal base 15 by stamping and at the same time, a plurality of cut-rising pieces 5T having inwardly projecting tip ends are formed on peripheral edges of the engaging holes 5H.

Figure 2B:
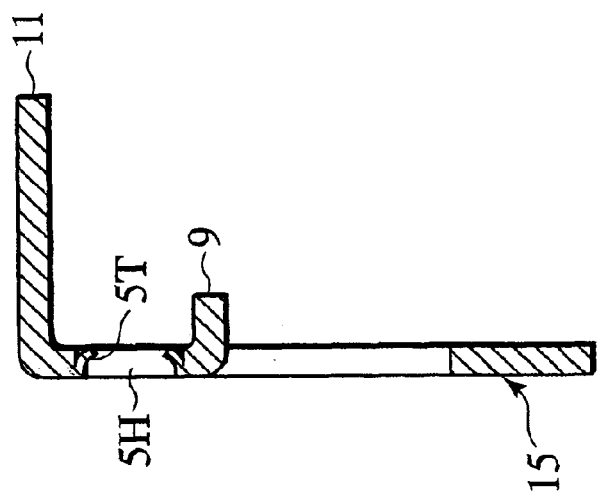
FIGS. 2A and 2B are explanatory diagrams of a metal base.
Figure 2A:
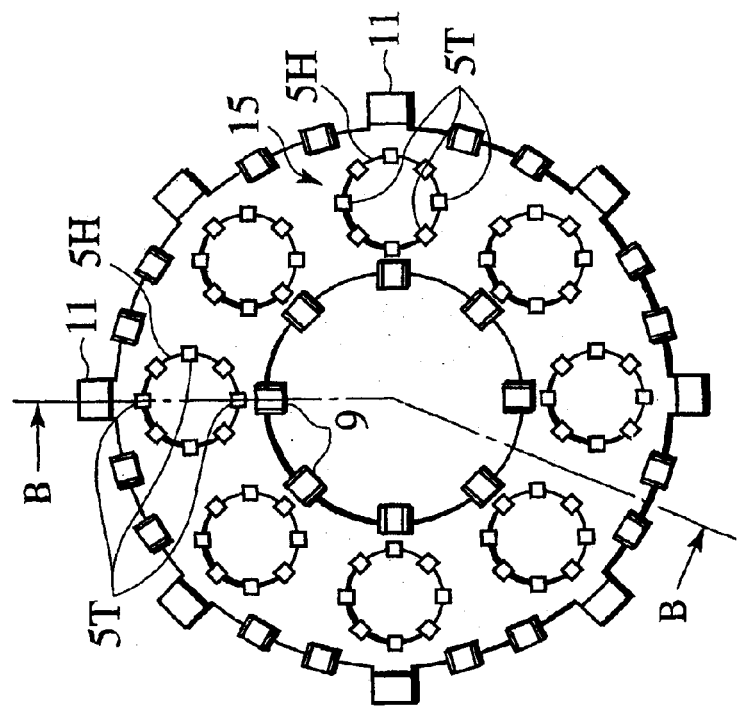
Figure 3:
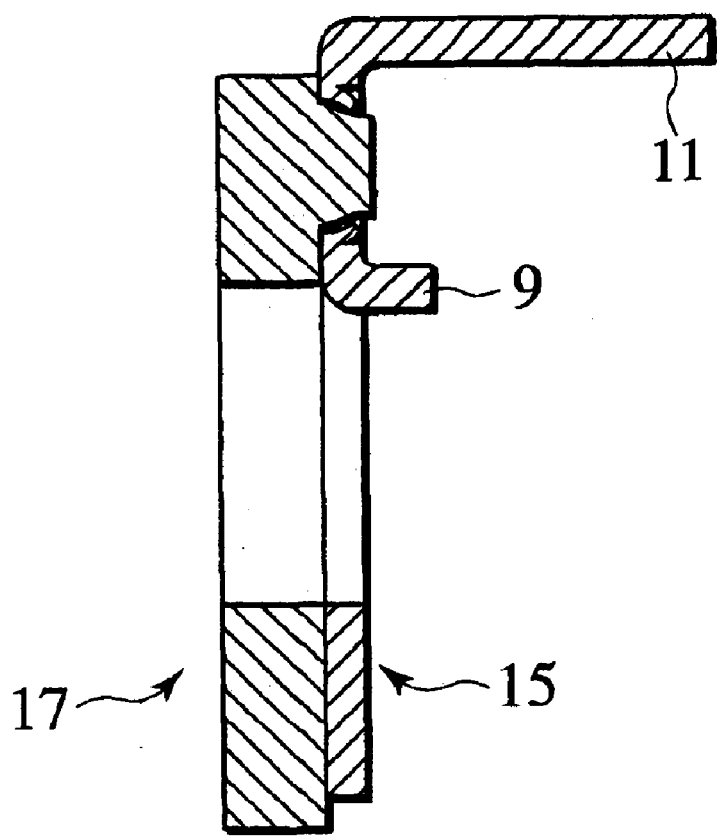
FIG. 3 is an explanatory diagram showing a state in which the carbon is mounted to the metal base.
Figure 4B:
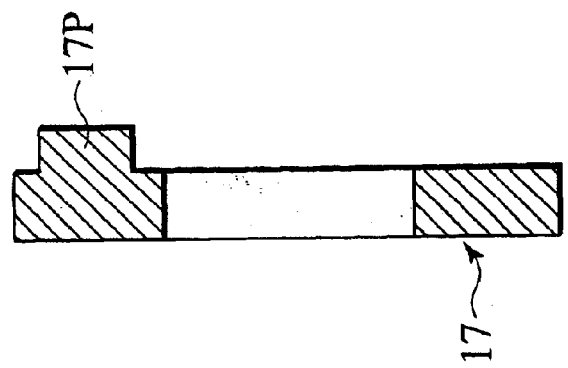
FIGS. 4A and 4B are explanatory diagrams of the carbon.
Figure 4A:
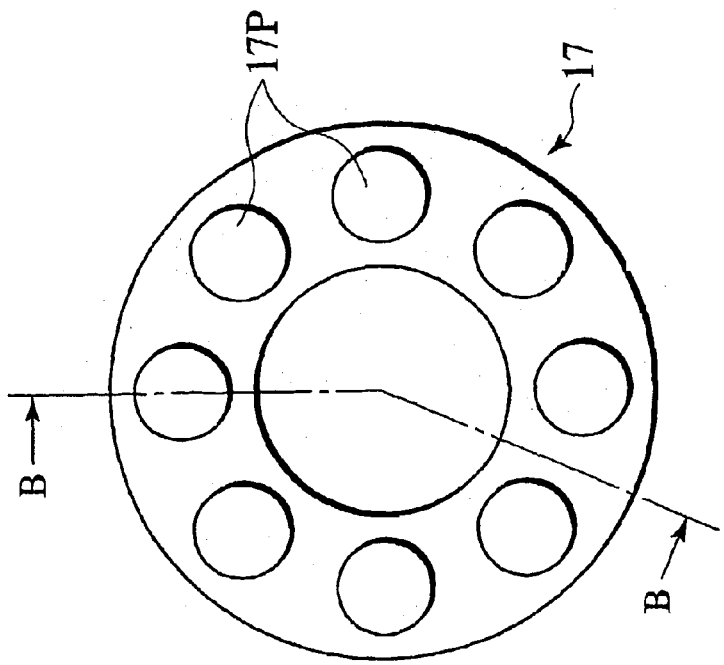

Next, as shown in FIG. 2, the anchor claws 9 and the wire bonding portion 11 of the metal base 15 are bent toward one side (in the pointing direction of the tip ends of the cut-rising pieces 5T). Then, as shown in FIG. 3, carbon 17 that was previously burnt into a doughnut shape at a high temperature is integrally fixed to the metal base 15. In order to integrally fix the metal base 15 and the carbon 17 to each other in this manner, as shown in FIG. 4, the doughnut-shaped carbon 17 is provided at its one side with a plurality of engaging projections 17P. As shown in FIG. 2, the metal base 15 is provided with engaging holes 5H formed in correspondence to the wire bonding portions 11, and as shown in FIG. 3, the engaging projections 17P are engaged with and inserted to the engaging holes 5H and integrally formed.

As described above, before the engaging projections 17P of the carbon 17 are inserted into and engaged with the engaging holes 5H, conductive paste is applied to peripheral faces of the engaging projections 17P, inner peripheral faces of the engaging holes 5H or appropriate regions in the vicinity thereof.

Figure 5:
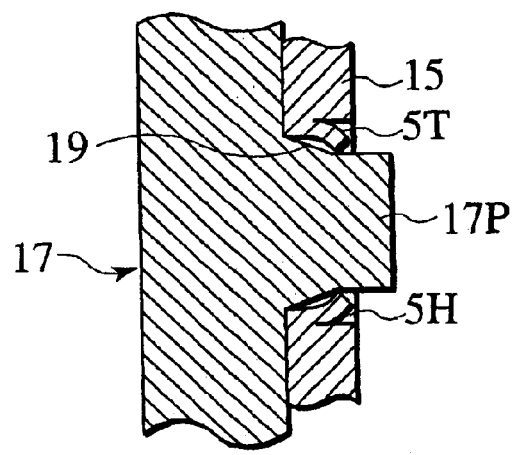
FIG. 5 is an explanatory diagram showing an engaged state between an engaging hole of the metal base and an iii projection of the carbon.

Thereafter, when the engaging projections 17P are inserted and engaged with the engaging holes 5H, the tip ends of the cut-rising pieces 5T provided on the engaging holes 5H come into contact with the peripheral faces of the engaging projections 17P such that the cut-rising pieces 5T strongly push the peripheral faces. Therefore, the peripheral faces of the engaging projections 17P receive trimming effect and generate scuff mark, and the peripheral faces of the engaging faces of the engaging projections 17P are formed into coarse faces. As shown in FIG. 5, outer peripheral faces of the cut-rising pieces 5T and the engaging projections 17P are formed with accumulating portions 19 made of conductive paste, and with the conductive paste, the conductivity is further enhanced.

If the engaging projections 17P of the carbon 17 are inserted and engaged with the engaging holes 5H as described above, the tip ends of the plurality of cut-rising pieces 5T are brought into contact with the peripheral faces of the engaging projections 17P under pressure and the tip ends dig into the peripheral faces, which makes it difficult to pull out the engaging projections 17P from the engaging holes 5H.

That is, the cut-rising pieces 5T allow the engaging projections 17P to be inserted into the engaging holes 5H, but when a force for pulling out the engaging projections 17P from the engaging holes 5H is acting, the cut-rising pieces 5T function such that the tip ends thereof dig into the peripheral faces of the engaging projections 17P to prevent the latter from being pulled out. In other word, the cut-rising pieces 5T function as a ratchet that only allows the relative movement in the inserting direction and prevent the relative movement in the opposite direction.

Therefore, in the operation for inserting the engaging projections 17P of the carbon 17 into the engaging holes 5H of the metal base 15, both the members can be formed integrally. Thus, it is easy to insert the engaging projections 17P into the engaging holes 5H, and after the inserting and engaging operation, special operation such as fluing operation is unnecessary unlike the prior example, and both the members can easily be formed integrally.

Figure 6:
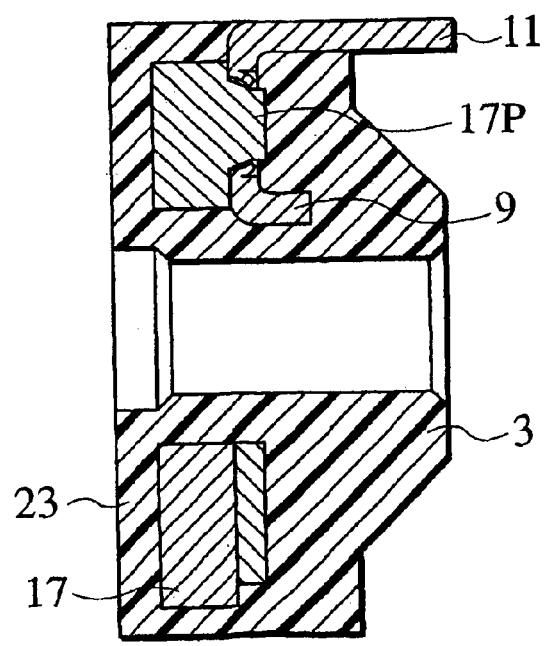
FIG. 6 is an explanatory diagram showing a state in which the carbon is coated with mold resin.

After the engaging projections 17P of the carbon 17 were inserted into and engaged with the engaging holes 5H of the metal base 15 and integrally formed as described above, the integrally formed material is set in a mold cavity (not shown), mold resin 23 is molded to form the commutator body 3. As shown in FIG. 6, the mold resin 23 is molded such that the entire face of the exposed face of the carbon 17 is coated or covered.

When the mold resin 23 is molded as described above, since the tip end side peripheral faces of the engaging projections 17P of the carbon 17 are formed into coarse faces by the cut-rising pieces 5T provided on the peripheral edges of the engaging holes 5H, the connecting strength between the engaging projections 17P and the mold resin 23 is enhanced.

After the mold resin 23 was molded as described above, the wire bonding portion 11 is subjected to necessary bending, and a hole 25 for fitting a motor shaft is subjected to cutting working as shown in FIG. 1. After the slit 27 was subjected to working, the carbon 17 and the metal base 15 are divided into each of segments 5. Then, the mold resin 23 is removed from a contact face with a brush B of the motor by cutting or the like, thereby obtaining a plane carbon commutator 1 as shown in FIG. 1.

As understood from the above description, according to the present embodiment, the entire face of the exposed face of the carbon 17 is coated with the mold resin 23 and in this state, necessary working is carried out, and the mold resin 23 is removed from the sliding face of the carbon in a final step.

Therefore, the mold resin 23 protects the carbon in each of various working steps. Thus, the carbon is protected from damage such as crack or chip during the bending of the wire bonding portion 11 and working step of the hole 25.

Further, according to the present embodiment, since the carbon 17 and the segments 5 are integrally fixed to each other by inserting and engaging the engaging projections 17P of the carbon 17 which were previously burnt at a high temperature into and with the engaging holes 5H of the metal base 15, the characteristics of the carbon which was burnt at a high temperature can be utilized, and there is no problem of soldering or adhesive.

As understood from the above explanation, according to the present invention, the peripheral edges of the engaging holes provided on the segments are provided with cut-rising pieces which function to allow the insertion of the engaging projections of the carbon into the engaging holes but prevent the engaging projections from being pulled out. The tip ends of the engaging holes are projected inward and brought into contact with the peripheral faces of the engaging projections. Therefore, in the operation for inserting and engaging the engaging projections into and with the engaging holes, the segments and the carbon can be made integrally, and it is easy to integrally form them, and the segments are held by the carbon reliably.

Further, when the engaging projections are inserted and engaged into and with the engaging holes, since the peripheral faces of the engaging projections are formed into coarse faces, it is unnecessary to form the peripheral faces of the engaging projections into coarse faces, and the connecting strength between the engaging projections and the mold resin when the latter is molded is enhanced.

Further, since the accumulating portions formed between the inner peripheral faces of the engaging holes and the outer peripheral faces of the engaging projections are electrically connected through the conductive paste, the conductivity is further enhanced.

What is claimed is:

1. A plane carbon commutator comprising:
    a plurality of metal segments fixed to a commutator body made of resin, said metal segments having engaging holes and cut-rising pieces forming tip ends projecting inwardly from peripheral edges of said engaging holes; and
    a carbon previously burnt at a high temperature, said carbon having engaging projections being engaged with said engaging holes provided in said metal segments and integrally formed as one unit, each engaging projection having an end and a peripheral side,
    wherein the tip ends of said cut-rising pieces extend inwardly from the peripheral edges of the holes to engage the peripheral sides of the engaging projections with pressure sufficient to form coarse faces on the peripheral sides as the projections are inserted into the holes, and to prevent said engaging projections from being pulled out from said engaging holes, so that it is unnecessary to form coarse faces on the peripheral sides of said engaging projections before inserting the projections into said engaging holes.

2. A plane carbon commutator according to claim 1, wherein conductive paste is interposed between said segments and said carbon.

3. A plane carbon commutator comprising:
    a plurality of metal segments fixed to a commutator body made of resin, said metal segments having engaging holes and cut-rising pieces rising from peripheral edges of said engaging holes; and
    a carbon previously burnt at a high temperature, said carbon having engaging projections being engaged with said engaging holes provided in said metal segments and integrally formed as one unit, said each engaging projection having a tip end and a peripheral side,
    wherein tip ends of said cut-rising pieces are operative to allow insertion of said engaging projections into said engaging holes, but operative to prevent said engaging projections from being pulled out from said engaging holes, and
    the tip ends of said cut-rising pieces are dimensioned to have a smaller diameter than the diameter of each engaging projection whereby said cut-rising pieces are brought into contact under pressure with said peripheral sides of said engaging projections, so that said cut-rising pieces form coarse faces on the peripheral faces of the tip end side of said engaging projections as said engaging projections pass through said engaging holes.

* * * * *